July 1, 1958     G. SCHWANK     2,841,133
RADIANT HEATER AND TOASTER
Filed March 7, 1955
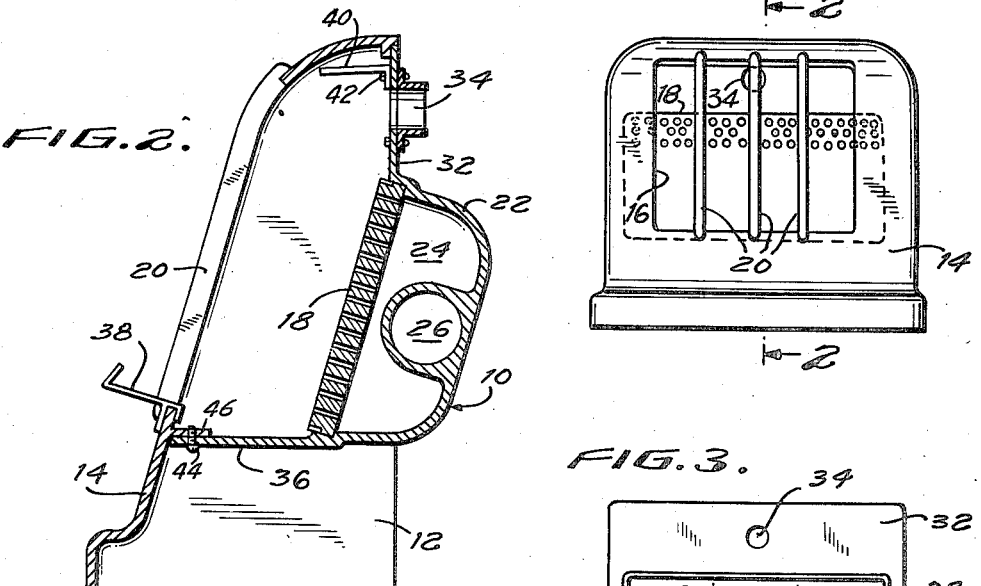

2,841,133

RADIANT HEATER AND TOASTER

Günther Schwank, Cologne-Kalk, Germany; Rheinisch-Westfälische "Revision" Treuhand Aktiengesellschaft (Treuhand Aktiengesellschaft), and Wilhelm Franken, executors of said Günther Schwank, deceased, assignors to American Infra Red Radiant Co., Inc., New York, N. Y., a corporation of Delaware Application March 7, 1955, Serial No. 492,718

4 Claims. (Cl. 126—92)

The present invention relates to radiant heaters and toasters, and more particularly, although not exclusively, to incandescent gas heaters and toasters.

Although the radiant heaters and toasters according to the present invention are more especially designed for use with radiation burners in accordance with my co-pending application Serial Number 214,468 filed March 8, 1951, and now Patent No. 2,775,294, granted December 25, 1956, they are not limited to this type of burner and can be used with any other type of incandescent radiating element burning gas or electricity.

The principal object of the present invention is to provide a radiant heater of small and compact construction, which is capable of use either as a space heater or as a toaster. In accordance with this object, the radiant heater and toaster of the present invention comprises a unitary housing, one of the substantial constructive elements of which is a burner element according to my above mentioned co-pending application.

A further object of the invention is to provide a radiant heater and toaster wherein the body of the heater and the burner element constitute a common body.

A still further object of the invention is to provide a radiant heater and toaster of the character described wherein the burner element constitutes the rear wall of the heater, the front wall of the heater being provided with a grille for protective and decorative purposes.

These and other objects and features of the invention will be more readily understood by reference to the accompanying drawings, wherein:

Figure 1 is a front view of a first embodiment of radiant heater and toaster according to the invention;

Figure 2 is a section to an enlarged scale on lines 2—2 of Figure 1;

Figure 3 is a view of a portion of the heater of Figures 1 and 2 looking toward the rear with the front portion removed;

The radiant heater and toaster according to Figures 1 to 3 comprises generally a burner element 10, which is indicated as being constructed in accordance with the radiation burners of my above mentioned co-pending application.

The burner element 10 is mounted by a housing comprising side walls or skirts 12, and a front wall 14. The front wall 14 is provided with an aperture 16 through which the heat from the burner element radiates outwardly.

In the embodiment according to Figures 1 to 3, the burner element 10 is provided with a closure plate 18 which is spaced rearwardly from the front wall 14 and aperture 16 of the housing. This aperture 16 is provided with a grille 20 for decorative or protective purposes.

The burner element indicated generally at 10 comprises a burner casing 22 defining a mixing chamber 24 for gas and combustion air. Inside the mixing chamber 24 is an injector 26 to which gas is supplied through a coupling 28. Immediately before entering into the mixing chamber, the gas supplied from the coupling 28 passes through an air inlet 30 through which air is sucked in to mix with the gas in the injector 26 and mixing chamber 24.

The burner element 10 formed integral with a rear wall 32 and bottom wall 36 defining therewith and with the grille 20 a combustion space from which the gases of combustion may escape through a flue 34 provided in the rear wall 32. Rear wall 32 and bottom wall 36, being integral with the burner casing 22, are attached to the heater housing by bolts connecting them to brackets and flanges. As seen in Fig. 2, burner 10 is suitably carried by the opposing side walls of its casing. In this connection, provision is made on the inner surface of each side wall for a bracket 40, only one of which is illustrated in Fig. 2, to which the upper wall of the casing is secured, as by the bolt 42. Said brackets are preferably integral with the associated side walls or skirt of the housing. As further illustrated in Fig. 2, the lower wall 36 of the casing is secured by a bolt 44 to an integral bracket 46 provided on the front housing base.

As shown, the closure plate 18 is somewhat inclined to radiate heat slightly upwardly, and the upper surface of bottom wall 36 may be highly polished to act as a reflector.

If desired, the heater may be provided with a small ledge 38 running along the bottom edge of the aperture 16, to act as a support for slices of bread to be toasted. This is an optional feature which is not shown in Figure 1.

It will therefore be seen that the heater according to the present invention comprises only two main structural parts, namely the heater housing 14 and the burner element 10, and thus obtaining a substantial standardization of manufacture with reduction of the number of parts and a consequent reduction in cost.

As here shown, the wall portion 32 and the wall 36 of the heater housing enclosure are cast integral with the shell or casing 22 of the burner, said shell defining with said wall portion 32, the rear wall of the housing enclosure. In the embodiment shown herein, the front wall 14 and the side walls 12 are formed preferably of sheet metal.

What I claim is:

1. A radiant gas space heater comprising a housing enclosure having an opening defined therein, and a burner casing mounted by said housing for the radiation of heat through said opening, said burner casing forming an outer structural wall portion of said housing, said burner casing comprising a shell open at one side thereof, an injector for supplying gas and air to said shell, and an apertured plate closing the open side of said shell and defining therewith a mixing chamber for the gas and combustion air, said shell constituting said housing wall portion and having a vertically extending rear wall integral with said shell casing and a bottom wall integral with said shell casing extending forwardly at the lower portion thereof, said housing having laterally spaced side walls and an apertured front wall extending therebetween, said shell extending between said side walls rearwardly of said front wall and in opposition to the front wall aperture, each of said side walls having a bracket on the inner surface and in the upper region thereof to which said vertically extending rear wall of the shell is secured, said front wall of said housing having an integral bracket extending inwardly of said housing below the aperture in said front wall to which said bottom wall of said casing is secured, said apertured plate being disposed rearwardly of and facing the front wall aperture of said housing.

2. A radiant gas space heater comprising a housing enclosure having an opening defined therein, and a burner casing mounted by said housing for the radiation of heat through said opening, said burner casing forming an outer structural wall portion of said housing, said burner casing comprising a shell open at one side thereof, an injector for supplying gas and air to said shell, and an apertured plate closing the open side of said shell and defining therewith a mixing chamber for the gas and combustion air, said shell constituting said housing wall portion and having a vertically extending rear wall integral with said shell casing and a bottom wall integral with said shell casing extending forwardly at the lower portion thereof, said bottom wall having a highly reflective upper surface, said housing having laterally spaced side walls and an apertured front wall extending therebetween, said shell extending between said side walls rearwardly of said front wall and in opposition to the front wall aperture, each of said side walls having a bracket on the inner surface and in the upper region thereof to which said vertically extending rear wall of the shell is secured, said front wall of said housing having an integral bracket extending inwardly of said housing below the aperture in said front wall to which said bottom wall of said casing is secured, said apertured plate being disposed rearwardly of and facing the front wall aperture of said housing.

3. A radiant gas space heater comprising a housing enclosure having an opening defined therein, and a burner casing mounted by said housing for the radiation of heat through said opening, said burner casing forming an outer structural wall portion of said housing, said burner casing comprising a shell open at one side thereof, an injector for supplying gas and air to said shell, and an apertured plate closing the open side of said shell and defining therewith a mixing chamber for the gas and combustion air, said shell constituting said housing wall portion and having a vertically extending rear wall integral with said shell casing and a bottom wall integral with said shell casing extending forwardly at the lower portion thereof, said rear wall being provided with a flue to permit the escape of the gases of combustion, said housing having laterally spaced side walls and an apertured front wall extending therebetween, said shell extending between said side walls rearwardly of said front wall and in opposition to the front wall aperture, each of said side walls having a bracket on the inner surface and in the upper region thereof to which said vertically extending rear wall of the shell is secured, said front wall of said housing having an integral bracket extending inwardly of said housing below the aperture in said front wall to which said bottom wall of said casing is secured, said apertured plate being disposed rearwardly of and facing the front wall aperture of said housing.

4. A radiant gas space heater comprising a housing enclosure having an opening defined therein, and a burner casing mounted by said housing for the radiation of heat through said opening, said burner casing forming an outer structural wall portion of said housing, said burner casing comprising a shell open at one side thereof, an injector for supplying gas and air to said shell, and an apertured plate closing the open side of said shell and defining therewith a mixing chamber for the gas and combustion air, said shell constituting said housing wall portion and having a vertically extending rear wall integral with said shell casing and a bottom wall integral with said shell casing extending forwardly at the lower portion thereof, said bottom wall having a highly reflective upper surface and said rear wall being provided with a flue to permit the escape of the gases of combustion, said housing having laterally spaced side walls and an apertured front wall extending therebetween, said shell extending between said side walls rearwardly of said front wall and in opposition to the front wall aperture, each of said side walls having a bracket on the inner surface and in the upper region thereof to which said vertically extending rear wall of the shell is secured, said front wall of said housing having an integral bracket extending inwardly of said housing below the aperture in said front wall to which said bottom wall of said casing is secured, said apertured plate being disposed rearwardly of and facing the front wall aperture of said housing.

References Cited in the file of this patent

UNITED STATES PATENTS

| | | |
|---|---|---|
| 585,815 | Dressler | July 6, 1897 |
| 1,304,755 | Ellis | May 27, 1919 |
| 1,567,691 | Wiederhold | Dec. 29, 1925 |
| 1,677,156 | Vaughn | July 17, 1928 |
| 1,841,542 | Daane | Jan. 19, 1932 |
| 1,867,110 | Signore | July 12, 1932 |
| 1,878,140 | Hicks | Sept. 20, 1932 |

FOREIGN PATENTS

| | | |
|---|---|---|
| 488,709 | Great Britain | July 12, 1938 |
| 574,767 | Great Britain | Jan. 18, 1946 |
| 540,190 | France | July 7, 1922 |
| 1,070,317 | France | Feb. 17, 1954 |
| 151,619 | Australia | May 17, 1951 |